US009296372B2

(12) United States Patent
Tsunekawa

(10) Patent No.: US 9,296,372 B2
(45) Date of Patent: Mar. 29, 2016

(54) CONTROL APPARATUS

(71) Applicant: TOYOTA JIDOSHA KABUSHIKI KAISHA, Toyota-shi, Aichi-ken (JP)

(72) Inventor: Jun Tsunekawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/261,987

(22) Filed: Apr. 25, 2014

(65) Prior Publication Data

US 2014/0350822 A1 Nov. 27, 2014

(30) Foreign Application Priority Data

May 21, 2013 (JP) ................. 2013-107412

(51) Int. Cl.
| B60T 7/12 | (2006.01) |
| B60T 7/22 | (2006.01) |
| B60W 50/023 | (2012.01) |
| B60W 50/04 | (2006.01) |
| B60W 30/09 | (2012.01) |
| B60T 7/04 | (2006.01) |
| B60W 50/00 | (2006.01) |

(52) U.S. Cl.
CPC . *B60T 7/12* (2013.01); *B60T 7/042* (2013.01); *B60T 7/22* (2013.01); *B60W 30/09* (2013.01); *B60W 50/023* (2013.01); *B60W 50/045* (2013.01); *B60T 2201/022* (2013.01); *B60W 2050/0006* (2013.01); *B60W 2520/10* (2013.01); *B60W 2540/12* (2013.01); *B60W 2710/182* (2013.01)

(58) Field of Classification Search
CPC ............ B60T 7/12; B60T 7/042; B60T 7/22; B60W 50/023; B60W 30/09; B60W 50/045
USPC ................ 701/36, 70, 96; 303/11, 113.4, 155
See application file for complete search history.

(56) References Cited

U.S. PATENT DOCUMENTS

| 2005/0057096 | A1* | 3/2005 | Kudo ............................. 303/155 |
| 2007/0145818 | A1* | 6/2007 | Kobayashi et al. ......... 303/113.4 |
| 2012/0007418 | A1* | 1/2012 | Furuyama ...................... 303/11 |
| 2013/0173113 | A1* | 7/2013 | Takiguchi et al. ............. 701/36 |

FOREIGN PATENT DOCUMENTS

| JP | 2007-191134 A | 8/2007 |
| JP | A-2012-196997 | 10/2012 |
| JP | B2-5103309 | 12/2012 |

\* cited by examiner

*Primary Examiner* — Fadey Jabr
*Assistant Examiner* — Yazan A Soofi
(74) *Attorney, Agent, or Firm* — Oliff PLC

(57) ABSTRACT

A control apparatus includes a first control part and a second control part. The first control part controls a control target based on a control amount that is output from the second control part and a command amount that is manually input, and permits the control amount to exceed a predetermined amount based on a standard when respective control directions of the control amount and the command amount are coincident with one another.

9 Claims, 5 Drawing Sheets

FIG.2

| SEVERITY | EXPOSURE | CONTROLLABILITY | | |
|---|---|---|---|---|
| | | C1 | C2 | C3 |
| S1 | E1 | QM | QM | QM |
| | E2 | QM | QM | QM |
| | E3 | QM | QM | ASIL A |
| | E4 | QM | ASIL A | ASIL B |
| S2 | E1 | QM | QM | QM |
| | E2 | QM | QM | ASIL A |
| | E3 | QM | ASIL A | ASIL B |
| | E4 | ASIL A | ASIL B | ASIL C |
| S3 | E1 | QM | QM | ASIL A |
| | E2 | QM | ASIL A | ASIL B |
| | E3 | ASIL A | ASIL B | ASIL C |
| | E4 | ASIL B | ASIL C | ASIL D |

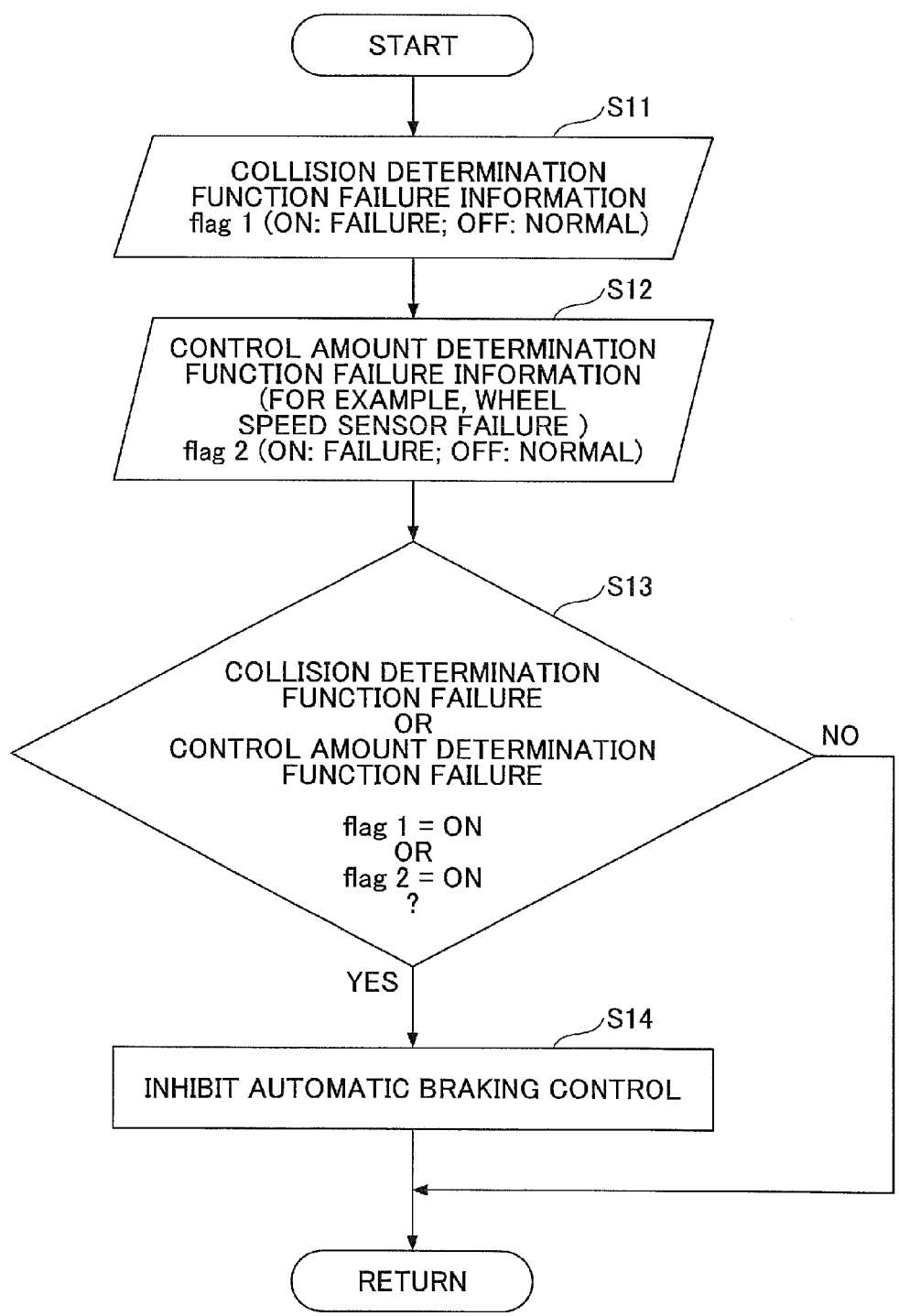

CONTROL APPARATUS

BACKGROUND OF THE INVENTION

1. Field of the Invention

The present invention relates to a control apparatus that controls braking, driving, steering and/or the like in a vehicle based on a parameter(s) obtained in the vehicle.

2. Description of the Related Art

In the related art, as such a control apparatus as that described above, a control apparatus is disclosed by Japanese Laid-Open Patent Application No. 2012-196997. The disclosed control apparatus divides the inter-vehicle distance between an own vehicle and a preceding vehicle that is a front object by a relative speed to calculate a time to collision, carries out alarming based on the time to collision, calls a driver's attention, and also, carries out automatic braking if necessary. In this control apparatus, when the driver carries out a collision avoiding operation, the control apparatus terminates the automatic braking.

SUMMARY OF THE INVENTION

A control apparatus according to the present invention includes a first control part and a second control part. The first control part controls a control target based on a control amount that is output from the second control part and a command amount that is manually input, and permits the control amount to exceed a predetermined amount based on a standard when respective control directions of the control amount and the command amount are coincident with one another.

Further, a control method according to the present invention includes controlling, by a first control part, a control target based on a control amount that is output from the second control part and a command amount that is manually input, and permitting the control amount to exceed a predetermined amount based on a standard when respective control directions of the control amount and the command amount are coincident with one another.

A program according to the present invention causes one or more processors to execute the control method.

A non-transitory information recording medium according to the present invention stores the program.

Other objects, features and advantages of the present invention will become more apparent from the following detailed description when read in conjunction with the accompanying drawings.

BRIEF DESCRIPTION OF THE DRAWINGS

FIG. 2 is a map showing reliability required based on a standard applied to the control apparatus 1 according to the embodiment;

FIGS. 4 and 5 are a flowchart showing control contents in the control apparatus 1 according to the embodiment.

DETAILED DESCRIPTION OF THE EMBODIMENT

Below, using the accompanying drawings, the embodiment of the present invention will be described.

First, for the sake of convenience of explanation, an objective of the embodiment will be described.

In the above-mentioned control apparatus disclosed by Japanese Laid-Open Patent Application No. 2012-196997, it may be difficult to obtain an appropriate control amount in a case where a predetermined value is set as an upper limit of automatic braking to make it be in conformity with the international standard ISO 26262 or the like, for example. The same thing can also be said when the control apparatus is used for controlling any of braking, driving, steering and so forth and it may be impossible to obtain an appropriate control amount.

The embodiment has been devised in consideration of this problem, and an objective of the embodiment is to provide a control apparatus by which it is possible to obtain an appropriate control amount even when a predetermined value is set as an upper limit to make it be in conformity with a standard.

Figure 1:
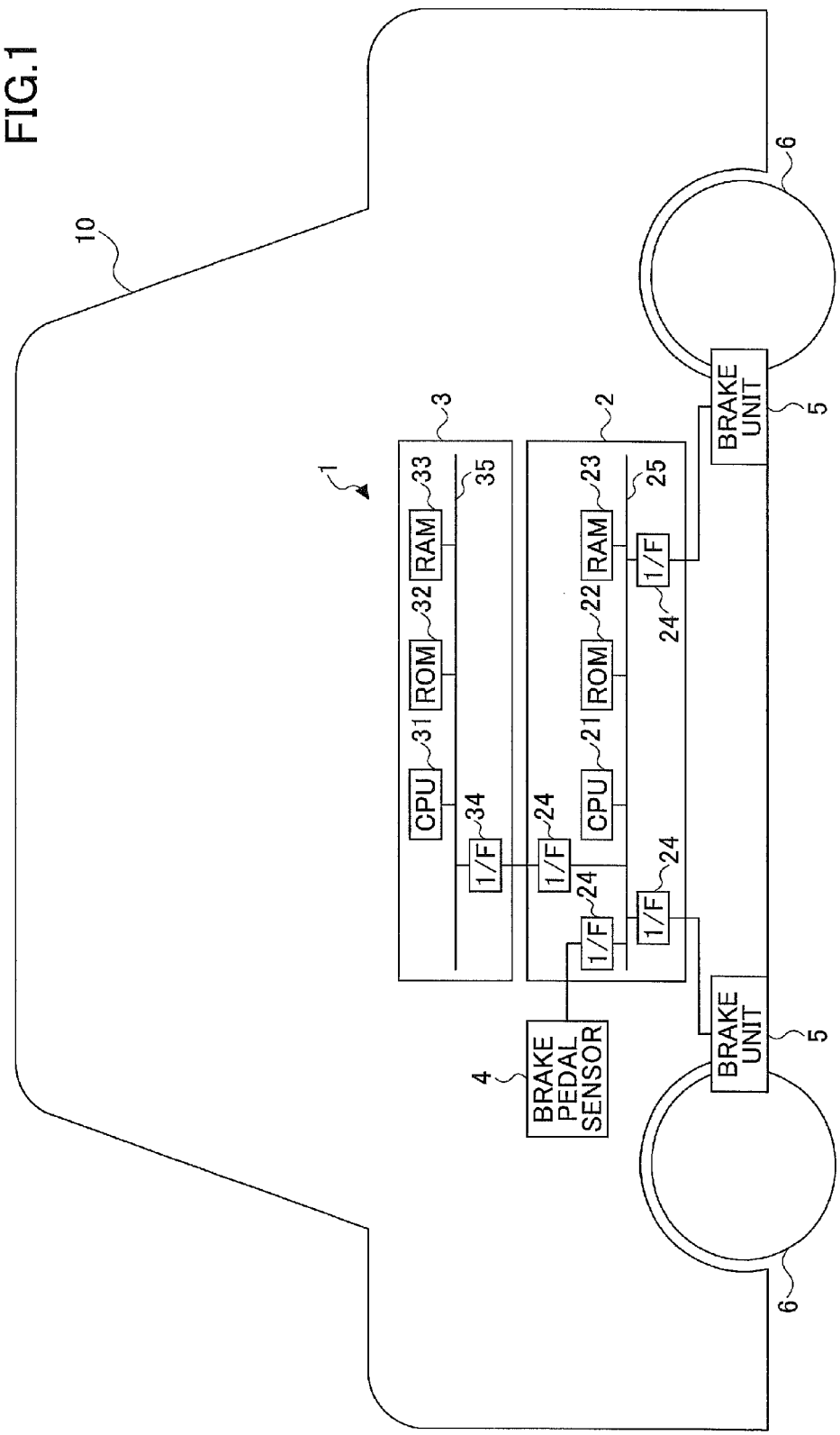
FIG. 1 is a block diagram showing a control apparatus 1 according to one embodiment.

A control apparatus 1 in the present embodiment includes, as shown in FIG. 1, a brake Electronic Control Unit (ECU) 2, a Pre-Crash Safety System ECU (PCSECU) 3 and a brake pedal sensor 4. The PCSECU 3 and the brake ECU 2 are mutually connected according to a communication standard such as a Controller Area Network (CAN). Note that, as for known configurations and functions concerning PCS and a brake, description will be made in a manner of simplification as appropriate.

The brake ECU 2 includes, for example, a CPU 21, a ROM 22, a RAM 23, and a data bus 25 connecting them, and an input/output interface 24. The CPU 21 carries out predetermined processes according to a program(s) stored in the ROM 22 that is one example of a non-transitory computer readable information recording medium. The brake ECU 2 is one example of the first control part.

The PCSECU 3 includes, for example, a CPU 31, a ROM 32, a RAM 33, and a data bus 35 connecting them, and an input/output interface 34. The CPU 31 carries out predetermined processes according to a program(s) stored in a ROM 32 that is one example of a non-transitory computer readable information recording medium. The PCSECU 3 is one example of the second control part.

The brake ECU 2 carries out braking of a vehicle 10 by controlling brake units 5 (control target) provided for the respective wheels 6 of the vehicle 10 based on a braking command including a braking amount (a control amount) from the PCSECU 3. Thus, the control apparatus 1 carries out automatic braking control.

In addition, the brake ECU 2 detects the vehicle speed V of the vehicle based on a wheel speed signal(s) from a wheel speed sensor(s) (not shown), and transmits the detection result to the PCSECU 3. The PCSECU 3 also detect the distance L between the vehicle and an obstacle or a preceding vehicle based on a measurement result of a millimeter wave radar (not shown), and further detects a relative speed Vr from a differential value of the distance L. The PCSECU 3 further calculates a time to collision (TTC) by dividing the distance by the relative speed Vr.

The PCSECU 3 compares the thus obtained TTC with a determination threshold T previously stored in the PCSECU 3, and, when the condition T≥TTC is satisfied, outputs the above-mentioned braking command(s) including the braking amount(s) (here, a deceleration amount(s)) to the brake ECU 2.

Based on the output of the brake pedal sensor 4, the brake ECU 2 carries out monitoring to determine whether the brake pedal stepping force (command amount) of a brake pedal (not shown) exceeds a pedal-on-determination value and the driver control direction (the control direction in the command amount) comes to be the braking direction (i.e., whether the driver in the vehicle 10 has a braking intention).

The map shown in FIG. 2 is used to evaluate a plurality of levels of severity, a plurality of levels of exposure and a plurality of levels of controllability for each of systems for which reliability is to be evaluated. Then, by using a combination of the respective evaluation results, any one of QM (Quality Management), Automotive Safety Integrity Level (ASIL) A, ASIL B, ASIL C and ASIL D is determined as a recommended value of reliability to be required for each of the systems. Note that, in FIG. 2, the direction of the stated order of ASIL A, ASIL B, ASIL C and ASIL D means a direction in which the required reliability increases gradually.

The brake ECU 2 previously stores a value of reliability recommended for the PCSECU 3 previously determined based on the map (shown in FIG. 2) prescribed in ISO 26262 and an actual value of reliability of the PCSECU 3. Note that in the present embodiment, illustratively, the recommended value of reliability for the PCSECU 3 is ASIL D and the actual value is ASIL B whereas the recommended value of reliability for the brake ECU 2 is ASIL D and the actual value is ASIL D. Thus, the actual value of reliability is higher in the brake ECU 2 than the PCSECU 3 in the present embodiment.

Figure 3:
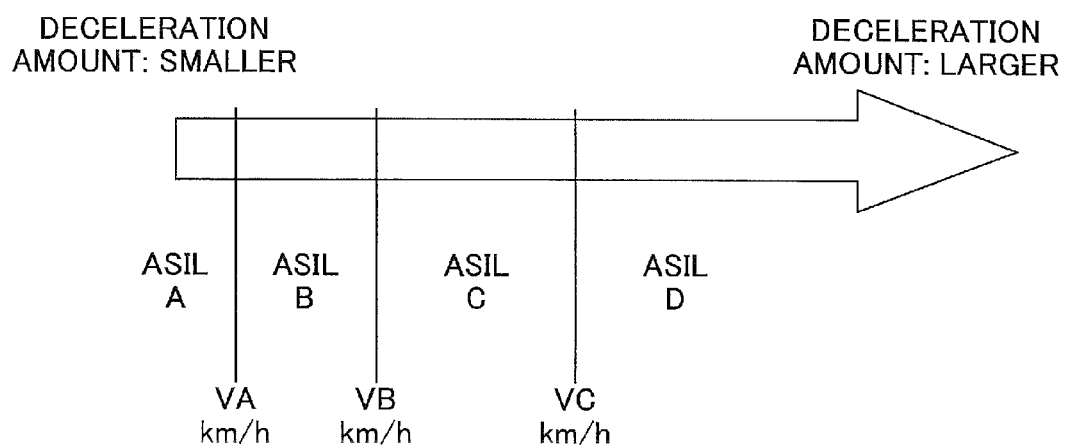
FIG. 3 is a map showing a way of determining a predetermined value based on the standard applied to the control apparatus 1 according to the embodiment.

The brake ECU 2 previously stores the above-mentioned actual value ASIL B of the reliability of the PCSECU 3, and also, previously stores a predetermined value Vth that is an upper limit of the control amount, i.e., the braking amount, corresponding to the actual value of reliability of the PCSECU 3 based on the map of FIG. 3 determined based on an ASIL determination simulation prescribed in ISO 26262 mentioned above. Note that, in the present embodiment, the braking amount is defined as a difference in a vehicle speed between before and after braking, and thus, has a negative value when the vehicle is decelerated due to the braking. Therefore, the above-mentioned predetermined value Vth has a negative value.

FIG. 3 shows a correlation in which, the more severe requirements for reliability the PCSECU 2 can satisfy in the stated order of ASIL A, ASIL B, ASIL C and ASIL D, the greater absolute value of the predetermined value Vth can be set for the PCSECU 2. In FIG. 3, ASIL along an abscissa denotes the actual value of reliability of the PCSECU 3. As the actual value of reliability of the PCSECU 3 is ASIL B as mentioned above, the corresponding predetermined value is Vth=VB(km/h), as shown in FIG. 3. Note that if the actual value of reliability of the PCSECU 3 were ASIL A, the corresponding predetermined value would be Vth=VA. Similarly, if the actual value of reliability of the PCSECU 3 were ASIL C, the corresponding predetermined value would be Vth=VC. If the actual value of reliability of the PCSECU 3 were ASIL D, the corresponding predetermined value would be Vth=−∞ and thus the restriction described below would not be imposed. This means that, the greater actual reliability the PCSECU 2 can have, the less restriction is to be imposed on the control amount that is output from the PCSECU 2.

The brake ECU 2 permits the absolute value of the braking amount (deceleration amount (having a negative value)) included in the braking command that is output from the PCSECU 3 to exceed the absolute value of the predetermined value Vth=VB (also having a negative value as mentioned above) only when the driver control direction is the braking direction, i.e., the control direction in the braking amount (control amount) is coincident with the control direction in the command amount (brake pedal stepping force). In other words, the brake ECU 2 otherwise does not permit the absolute value of the braking amount to exceed the absolute value of the predetermined value VB and outputs to the PCSECU 3 a stopping command to stop the above-described automatic braking control using TTC, i.e., to stop the braking command from being output. Based on the stopping command, the PCSECU 3 stops the automatic braking control.

Note that the PCSECU 3 carries out a diagnosis to determine whether an own collision determination function is out of order; and the brake ECU 2 carries out a diagnosis to determine whether an own control amount determination function for determining whether the absolute value of the braking amount exceeds the absolute value of the predetermined value Vth=VB is out of order. When either one of these diagnosis results indicates that the corresponding function is out of order, the PCSECU 3 stops the automatic braking control.

Figure 4:
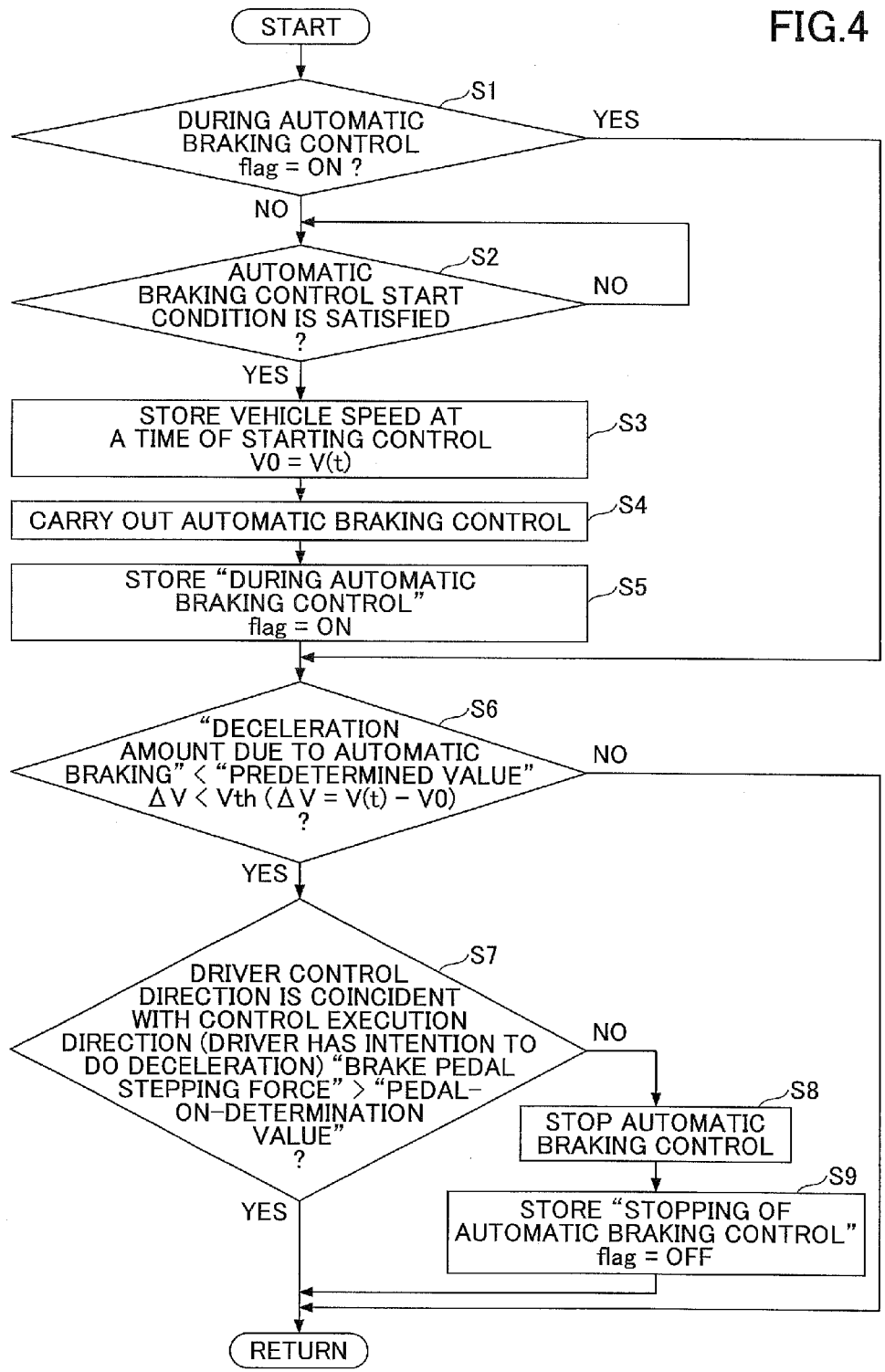

Below, control contents in the control apparatus 1 according to the present embodiment will be described using a flowchart. FIGS. 4 and 5 are a flowchart showing control contents in the control apparatus 1 according to the present embodiment of the present invention.

In step S1 shown in FIG. 4, the PCSECU 3 determines whether automatic braking control is being carried out by determining whether a flag has an on state. When it is determined that automatic braking control is being carried (Yes in step S1), the process proceeds to step S6. When it is determined that automatic braking control is not being carried (No in step S1), the process proceeds to step S2.

In step S2, the PCSECU 3 determines whether the above-described TTC is less than or equal to the determination threshold T and thus an automatic braking control start condition is satisfied. When it is determined that the automatic braking control start condition is satisfied (Yes in step S2), the process proceeds to step S3. When it is determined that the automatic braking control start condition is not satisfied (No in step S2), the process returns to step S2.

In step S3, the PCSECU 3 stores the current vehicle speed value V(t) at the time of starting automatic braking control as a control started time vehicle speed V0, carries out automatic braking control in step S4 and records the flag having the on state indicating that automatic braking control is being carried out in step S5.

In step S6, the brake ECU 2 carries out automatic braking based on the braking amount that is output from the PCSECU 3 as a result of it carrying out the automatic braking control and determines whether the absolute value of the deceleration amount $\Delta V = V(t) - V0$ exceeds the absolute value of the predetermined value Vth=VB. Then, when it is determined S6 that the absolute value of the deceleration amount $\Delta V$ exceeds the absolute value of the predetermined value Vth (Yes in step S6), the process proceeds to step S7. When it is determined that the absolute value of the deceleration amount $\Delta V$ does not exceed the absolute value of the predetermined value Vth (No in step S6), the process proceeds to RETURN. Note that $\Delta V$ has a negative value since the vehicle is decelerated as mentioned above, and thus, the determination in step S6 is actually a determination as to whether the inequality $\Delta V < Vth$ holds.

In step S7, the brake ECU 2 determines whether the brake pedal stepping force obtained from monitoring the output of the brake pedal sensor 4 is greater than the pedal-on-determination value and thus the driver control direction is the braking direction, also the control direction in the automatic braking control is the braking direction, and thus the respective control directions are coincident with one another. In a case where the determination result is affirmative (Yes in step S7), the process proceeds to RETURN. In a case where the determination result is negative (No in step S7), the process proceeds to step S8.

In step S8, the brake ECU 2 outputs the stopping command to stop the automatic braking control to the PCSECU 3. The PCSECU 3 stops the automatic braking control based on the stopping command and records the flag having an off state indicating the stop of the automatic braking control (step S9).

In the control apparatus 1, as shown in the flowchart of FIG. 5, the PCSECU 3 obtains collision determination function failure information in step S11. The collision determination function failure information is implemented by a flag 1. The flag 1 has an on state that indicates that the above-mentioned collision determination function is out of order and has an off state that indicates the collision determination function is normal. Also, the brake ECU 2 obtains control amount determination function failure information in step S12. The control amount determination function information is implemented by a flag 2. The flag 2 has an on state that indicates the above-mentioned control amount determination function is out of order and has an off state that indicates the control amount determination function is normal. An example of the control amount determination function being out of order is the wheel speed sensor being out of order.

In step S13, the PCSECU 3 determines whether the collision determination function is out of order based on the above-mentioned flag 1. Also, the brake ECU 2 determines whether the control amount determination function is out of order based on the above-mentioned flag 2 and transmits a determination result to the PCSECU 3.

In step S13, the PCSECU 3 thus determines whether the collision determination function and the control amount determination function are out of order by determining whether the flag 1 and the flat 2 have the on states, respectively. When at least one of the flag 1 and the flat 2 has the on state, i.e., either one of the collision determination function and the control amount determination function is out of order, the PCSECU 3 inhibits execution of automatic braking control in step S14. Thus, the flowchart shown in FIG. 4 is executed insofar as execution of the flowchart shown in FIG. 5 results in No in step S13.

Advantageous effects such as those shown below can be obtained from the control apparatus 1 according to the present embodiment implemented by the above-described control contents and the control method implemented simultaneously. That is, based on the control amount that is output from the PCSECU 3 (second control part), the brake ECU 2 (first control part) carries out control. When the actual value of reliability of the PCSECU 3 is less than the recommended value (in the embodiment, the former is ASIL B and thus is less than the latter ASIL D), the brake ECU 2 having the higher reliability does not permit the deceleration amount (in the embodiment, the deceleration amount corresponding to ASIL C or ASIL D) corresponding to the reliability greater than the actual value of reliability of the PCSECU 3 unless the driver control direction and the control direction in the control amount from the PCSECU 3 are coincident with one another. That is, the brake ECU 2 does not permit the deceleration amount corresponding to reliability higher than the actual reliability of the PCSECU 3 unless two conditions are satisfied simultaneously, one of the two conditions being the driver pressing the brake pedal more than the pedal-on determination value and the other of the two conditions being the PCSECU 3 outputting such a braking command as to decelerate the vehicle. In other words, when the PCSECU 3 outputs such a braking command so as to decelerate the vehicle by a deceleration amount requiring reliability higher than the actual reliability of the PCSECU 3, the brake ECU 2 does not permit the braking command unless the driver presses the brake pedal more than the pedal-on determination value. Thus, the reliability is improved.

On the other hand, when the driver control direction and the control direction in the control amount from the PCSECU 3 are coincident with one another, the brake ECU 2 can permit the deceleration amount corresponding to reliability higher than the actual value of reliability of the PCSECU 3. Thus, it is possible to more appropriately ensure the deceleration amount, i.e., the braking amount (control amount) if necessary. In other words, in the above-described example in the embodiment, when the driver presses the brake pedal more than the pedal-on determination value and also the PCSECU 3 outputs such a braking command as to decelerate the vehicle, a restriction according to the concept of ISO 26262 is not imposed on automatic braking control even if the PCSECU 3 outputs the deceleration amount corresponding to reliability higher than the actual reliability of the PCSECU 3. Note that, by thus determining by the brake ECU 2 whether the driver control direction caused by the driver's manual operation of the brake pedal and the control direction in the control amount output from the PCSECU 3 are coincident with one another, it is possible to confirm that the automatic braking control carried out by the PCSECU 3 is not caused by malfunction of the PCSECU 3.

Thus, the preferable embodiment of the present invention has been described in detail. However, the present invention is not limited to this embodiment, and variations and modifications may be made without departing from the scope of the present invention.

For example, in the above-described embodiment, braking is assisted based on the control apparatus 1. However, another embodiment can be devised according to the present invention in which steering is assisted based on Lane Keep Assist (LKA) and/or Lane Departure Warning (LDW). Further, yet another embodiment can be devised according to the present invention in which driving is assisted based on Adaptive Cruse Control (ACC). In any of these embodiment, an ECU as one example of the second control part controls, based on appropriate detection items, another ECU as one example of the first control part that carries out outputting in a last stage for braking, steering or driving in a vehicle. The corresponding one of a braking amount, a steering amount and a driving amount is the control amount in each of the above-mentioned embodiments.

The present invention relates to a control apparatus and can be applied to automatic braking based on PCS, automatic steering based on LKA and/or LDW, driving control based on ACC and so forth. Therefore, the present invention is advantageous when being applied to various vehicles such as a passenger car, a truck, a bus and so forth.

The present application is based on and claims the benefit of priority of Japanese Priority Application No. 2013-107412 filed on May 21, 2013, the entire contents of which are hereby incorporated herein by reference.

What is claimed is:

1. A control apparatus comprising:
one or more processors configured to implement:
a first control part that controls a control target based on a control amount that is output from a second control part and a command amount that is manually input, and permits the control amount to exceed a predetermined amount based on a standard when respective control directions in the control amount and the command amount are coincident with one another so as to permit the control amount corresponding to a reliability higher than a reliability of the second control part; and the second control part that outputs the control amount to the first control part, wherein the predetermined amount based on the standard restricts control operation carried out by the second control part depending on the reliability of the second control part so that the first control part does not permit the control amount corresponding to a reliability higher than the reliability of the second control part when the respective control directions are not coincident with one another.

2. The control apparatus as claimed in claim 1, wherein the first control part controls a brake unit in a vehicle as the control target and carries out automatic braking control based on the control amount that is output from the second control part.

3. The control apparatus as claimed in claim 2, wherein
the first control part detects a speed of the vehicle, transmits a detection result to the second control part and determines whether the control direction in the command amount is a braking direction based on an output of a brake pedal sensor in the vehicle, and
the second control part detects a distance between the vehicle and an obstacle or a preceding vehicle, detects a relative speed of the obstacle or the preceding vehicle with respect to the vehicle based on a differential value of the distance, calculates a time to collision concerning the obstacle or the preceding vehicle by dividing the distance by the relative speed, compares the time to collision with a threshold and outputs the control amount to the first control part depending on a comparison result.

4. A control method comprising:
controlling, by a first control part implemented by one or more processors, a control target based on a control amount that is output from a second control part implemented by one or more processors and a command amount that is manually input; and
permitting, by the first control part, the control amount to exceed a predetermined amount based on a standard when respective control directions of the control amount and the command amount are coincident with one another so as to permit the control amount corresponding to reliability higher than a reliability of the second control part, wherein the predetermined amount based on the standard restricts control operation carried out by the second control part depending on the reliability of the second control part so that the first control part does not permit the control amount corresponding to reliability higher than the reliability of the second control part when the respective control directions are not coincident with one another.

5. The control method as claimed in claim 4, wherein
the first control part controls a brake unit in a vehicle as the control target and carries out automatic braking control based on the control amount that is output from the second control part.

6. The control method as claimed in claim 5, wherein
the first control part detects a speed of the vehicle, transmits a detection result to the second control part and determines whether the control direction in the command amount is a braking direction based on an output of a brake pedal sensor in the vehicle, and
the second control part detects a distance between the vehicle and an obstacle or a preceding vehicle, detects a relative speed of the obstacle or the preceding vehicle with respect to the vehicle based on a differential value of the distance, calculates a time to collision concerning the obstacle or the preceding vehicle by dividing the distance by the relative speed, compares the time to collision with a threshold and outputs the control amount to the first control part depending on a comparison result.

7. A non-transitory computer readable information recording medium storing a program that causes one or more processors to:
control, by a first control part implemented by the one or more processors, a control target based on a control amount that is output from a second control part implemented by the one or more processors and a command amount that is manually input; and
permit, by the first control part, the control amount to exceed a predetermined amount based on a standard when respective control directions of the control amount and the command amount are coincident with one another so as to permit the control amount corresponding to a reliability higher than a reliability of the second control part, wherein the predetermined amount based on the standard restricts control operation carried out by the second control part depending on the reliability of the second control part so that the first control part does not permit the control amount corresponding to a reliability higher than the reliability of the second control part when the respective control directions are not coincident with one another.

8. The non-transitory computer readable information recording medium as claimed in claim 7, wherein the first control part controls a brake unit in a vehicle as the control target and carries out automatic braking control based on the control amount that is output from the second control part.

9. The non-transitory computer readable information recording medium as claimed in claim 8, wherein:
the first control part detects a speed of the vehicle, transmits a detection result to the second control part and determines whether the control direction in the command amount is a braking direction based on an output of a brake pedal sensor in the vehicle, and
the second control part detects a distance between the vehicle and an obstacle or a preceding vehicle, detects a relative speed of the obstacle or the preceding vehicle with respect to the vehicle based on a differential value of the distance, calculates a time to collision concerning the obstacle or the preceding vehicle by dividing the distance by the relative speed, compares the time to collision with a threshold, and outputs the control amount to the first control part depending on a comparison result.

* * * * *